F. E. BAGER.
STEERING GEAR MECHANISM.
APPLICATION FILED MAY 27, 1916.

1,233,299.

Patented July 17, 1917.
2 SHEETS—SHEET 2.

Witnesses
Arthur W. Carlson
Robert H. Weir

Inventor.
Frederic E. Bager
By Arthur T. Durand atty.

UNITED STATES PATENT OFFICE.

FREDERIC E. BAGER, OF KENOSHA, WISCONSIN, ASSIGNOR TO FREDERICK C. AUSTIN, OF CHICAGO, ILLINOIS.

STEERING-GEAR MECHANISM.

1,233,299.  Specification of Letters Patent.  Patented July 17, 1917.

Application filed May 27, 1916. Serial No. 100,410.

*To all whom it may concern:*

Be it known that I, FREDERIC E. BAGER, a citizen of the United States of America, and resident of Kenosha, Kenosha county, Wisconsin, have invented a certain new and useful Improvement in Steering-Gear Mechanism, of which the following is a specification.

My invention relates to steering-gear-mechanism for steam-shovels, drag-line bucket-excavators, and other heavy machines of similar character.

Generally stated, the object of my invention is to provide an improved steering-gear-mechanism for controlling the steering wheels of a vehicle of any suitable or desired character, but adapted more particularly for use on heavy machines, such as excavators and other similar machines which are ordinarily very large and cumbersome in character.

More specifically considered, the object of my invention is to provide a steering-gear-mechanism of this kind which is adapted more particularly for use in conjunction with steering wheels provided with spindles which are pivoted at their outer ends, whereby the inner ends of said spindles are arranged close together and in position to be conveniently connected with the device by which the steering-gear-mechanism is controlled.

It is also an object to provide certain details and features of construction and combinations tending to increase the general efficiency and serviceability of a steering-gear-mechanism of this particular character.

To these and other useful ends, my invention consists in matters hereinafter set forth and claimed.

In the accompanying drawings:—

Figure 1:
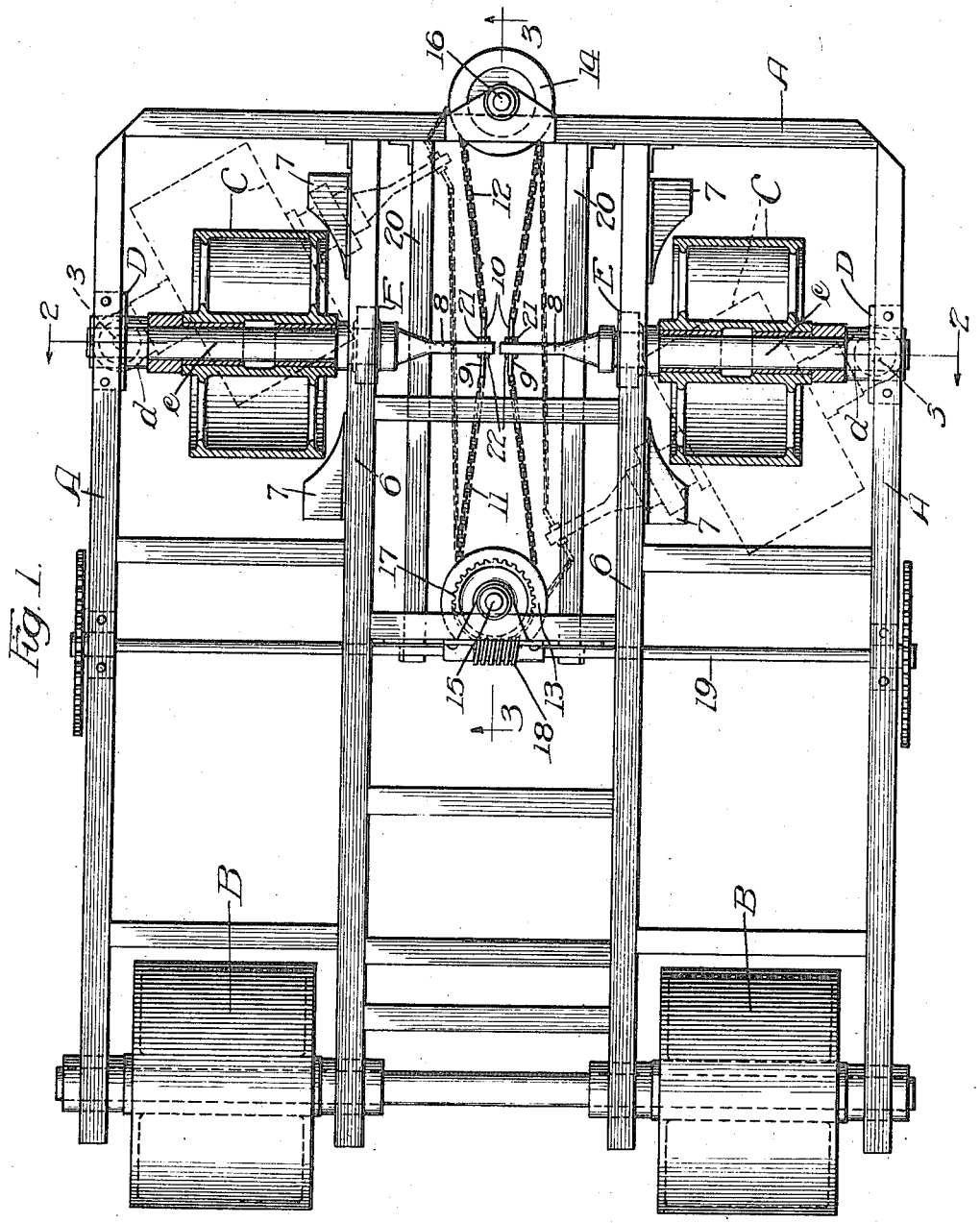
Figure 1 is a plan of a body-frame provided with steering wheels having a steering-gear-mechanism embodying the principles of my invention, the said steering wheels being shown in horizontal section.
Figure 2:
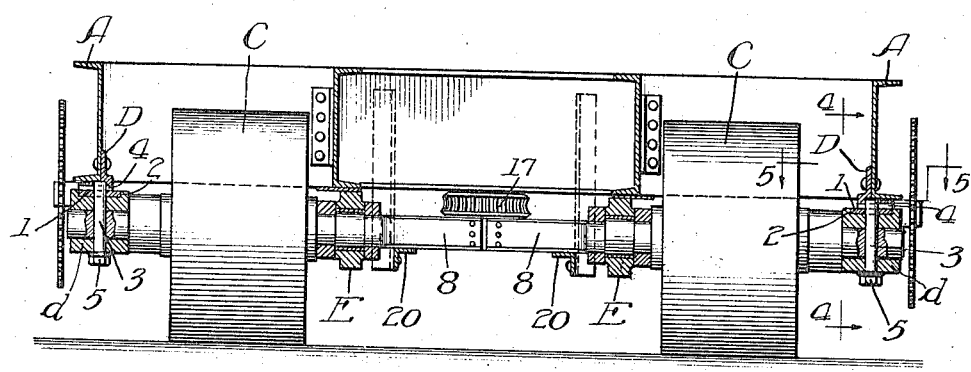
Fig. 2 is an end view of the structure shown in Fig. 1, showing certain parts in vertical section on line 2—2.
Figure 3:
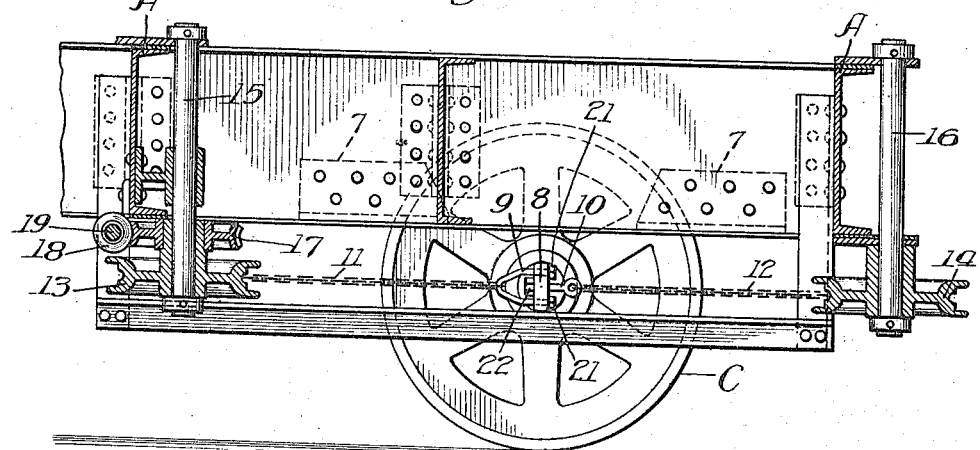
Fig. 3 is an enlarged detail section on line 3—3 in Fig. 1.
Figure 4:
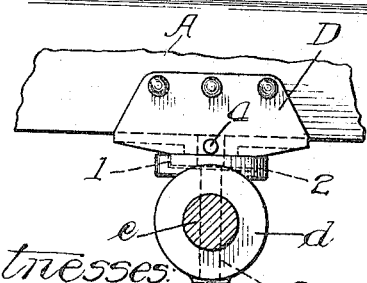
Fig. 4 is an enlarged detail section on line 4—4 in Fig. 2.
Figure 5:
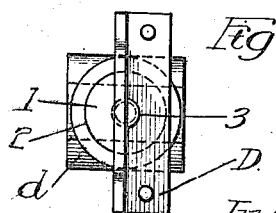
Fig. 5 is an enlarged section on line 5—5 in Fig. 2.

As thus illustrated, my invention comprises a body-frame A of any suitable, known or approved character. The rear driving-wheels B may be operated in any suitable or desired manner. The front steering wheels C are mounted on spindles $c$ which have their outer ends pivoted on the body-frame. Any suitable means can be employed for pivoting the said spindles at their outer ends, but this is preferably accomplished by providing a body-frame with brackets D which are rigidly secured thereto, and which are supported by the casting $d$ on the spindles. Each bracket D is provided with a lower rounded portion 1 which occupies the shallow seat or socket 2 in the top of the casting $d$, the latter being secured to the spindles $c$ by means of a vertically disposed bolt 3 which extends downward through the bracket D and the said casting and spindles. The upper end-portion of this bolt or pin 3 is enlarged and held against rotation by a horizontal pin 4 which is inserted through the casting $d$ in a direction transverse of the body-frame. The lower end of the bolt or pin 3 is preferably provided with a nut 5 to prevent the casting $d$ from slipping off or dropping down. Thus, the outer end of each spindle $c$ is provided with a pivot, and with this arrangement the two spindles can each swing about a vertical axis, so that the wheels C can be turned in the desired direction. Near their inner ends, the spindles $c$ are provided with rollers E which rotate thereon and which bear against the under sides of the body-frame-members 6, which latter are provided on their outer sides with short sections of angle-iron 7 upon which the said rollers can travel when the wheel-spindles are skewed or swung around to steer the excavator or other vehicle in the desired direction. When the spindles are in alinement, the rollers E engage the frame-members 6, but when the two spindles are skewed, as shown in dotted lines in Fig. 1, these rollers will then leave the frame-members 6 and engage the sections 7 of angle-iron or other suitable means, whereby each roller E has a curved path of travel on the under side of the body-frame. Thus, the weight of the excavator or other machine or vehicle is supported on the spindles $c$, at opposite sides of the two steering wheels, and by skewing the spindles the machine or vehicle can be steered in the desired manner. For this purpose, the inner end-portions 8 of the two wheel-spindles are preferably close together and provided with devices 9 and 10 for connecting them with the chains 11 and 12, which latter extend around the wheels 13 and 14 mounted on the lower ends of vertically-disposed spindles or shafts 15 and 16, the latter being supported in suitable bearings on the body-frame. Thus, the chain 11 extends from the device 9 on one wheel-spindle, around the wheel 13, and then to the other device 9 on the other wheel-spindle. Similarly, the chain 12 extends from the device 10 on one wheel-spindle, around the wheel 14, and then back to the other device 10 on the other wheel-spindle. These wheels 13 and 14 are of such character that they will have positive engagement with the chains, so that when these wheels are turned the said chains will operate the wheel-spindles to control the steering wheels. Any suitable arrangement can be employed for doing this, but with the construction shown and described, which is illustrative of my invention, the wheel 13 is rigid with a worm-wheel 17 which engages the worm 18 on the transverse shaft 19, the latter being mounted in suitable bearings on the under side of the body-frame. Any suitable arrangement can be employed for rotating this shaft 19, and when this is done the wheel 13 will be rotated or turned in one direction or the other, causing the chain 11 to pull on one of the wheel-spindles, and thereby causing the chain 12 to pull on the other wheel-spindle, thus skewing the two spindles in the desired manner for the purpose of steering the machine or vehicle to the right or left. Angle-irons 20 are arranged parallel and longitudinal of the body-frame and are suitably secured to the under side of the latter, below the wheel-spindle end-portions 8, whereby the latter are held against dropping down in the event that either steering wheel may leave the ground for a short distance, thus preventing undue strain on the pivotal connections for the outer ends of the wheel-spindles, it being borne in mind that these steering wheels are necessarily quite heavy.

The connecting device 9 is preferably in the form of a U-bolt inserted through the wheel-spindle end-portions 8 and fastened in place by nuts 21, while the devices 10 may be ordinary eye-bolts inserted through the said wheel-spindles and held in place by nuts 22, or by any other suitable means.

In the use of a steam-shovel or drag-line bucket-excavator, or other heavy machine of this kind, the strains on the body frame are considerable, and this is especially true when the structure is passing over uneven ground. At such times, there will be more or less yielding as between the different parts, and the improved steering-gear-mechanism shown and described is particularly adapted for use under such conditions, as it is of such character that it will not be liable to break or become jammed and inoperative. The construction is, therefore, designed with special reference to its use in connection with very heavy and cumbersome machines, such as excavators or other similar portable machines.

From the foregoing, it will be seen that the steering axes provided by the pivots 3 are outside of the wheels, so that said wheels C are disposed between these axes and the swinging inner ends of the spindles. In this way, the weight is supported on opposite ends of each spindle, and the operation of the steering gear is rendered easy and effective in character, as the weight does not tend to tilt the spindles upward at either end. When the wheels are operated about their vertically disposed steering axes, the treads of the two wheels move outward and away from each other, so that the width of the wheel-base is not decreased. The steering gear is conveniently applied, with this arrangement and mode of operation, to the adjacent inner ends of the wheel spindles, and one wheel tends to balance the other when the machine is traveling along, the inner ends of the spindles pulling backward on the chain 12, but the worm gearing 17 and 18 serves to hold the wheels in any direction in which they are turned.

What I claim as my invention is:—

1. In a steering-gear-mechanism for excavators or other portable machines or vehicles, a pair of supporting wheels, spindles for said wheels, a body-frame, elements for pivotally connecting the outer ends of said spindles with said body-frame so that the vertically disposed steering axes are outside of said wheels, means for movably supporting the frame on the inner end-portions of said wheel-spindles, and devices connected with the inner ends of said wheel-spindles to skew said wheels.

2. In a steering-gear-mechanism for excavators or other portable machines or vehicles, a pair of supporting wheels, spindles for said wheels, a body-frame, elements for pivotally connecting the outer ends of said spindles with said body-frame so that the vertically disposed steering axes are outside of said wheels, means for movably supporting the frame on the inner end-portions of said wheel-spindles, said means including two rollers between the wheels on said wheel-spindles to engage the under side of the body-frame, and devices connected with the inner ends of said wheel-spindles to skew said wheels.

3. In a steering-gear-mechanism for excavators or other portable machines or vehicles, a pair of supporting wheels, spindles for said wheels, a body-frame, elements for pivotally connecting the outer ends of said spindles with said body-frame so that the vertically disposed steering axes are outside of said wheels, means for movably supporting the frame on the inner end-portions of said wheel-spindles, devices connected with the inner ends of said wheel-spindles to skew said wheels, said elements including brackets fastened to the body-frame, and castings secured to the outer ends of said spindles and provided with seats for the lower ends of said brackets, each bracket and its alloted casting being provided with a vertical pivot-member which holds the spindle against rotation.

4. In a steering-gear-mechanism for excavators or other portable machines or vehicles, a pair of supporting wheels, spindles for said wheels, a body-frame, elements for pivotally connecting the outer ends of said spindles with said body-frame, means for supporting the frame on the inner end-portions of said wheel-spindles, and devices connected with the inner ends of said wheel-spindles to skew said wheels, said devices including front and rear wheels each mounted on the body-frame to turn about a vertical axis, and each wheel having a belt thereon, the ends of each belt being connected respectively with the inner ends of the two wheel-spindles, whereby rotation of one wheel in either direction will cause rotation of the other wheel in the opposite direction.

5. In a steering-gear-mechanism for excavators or other portable machines or vehicles, a pair of supporting wheels, spindles for said wheels, a body-frame, elements for pivotally connecting the outer ends of said spindles with said body-frame so that the vertically disposed steering axes are outside of said wheels, means for movably supporting the frame on the inner end-portions of said wheel-spindles, and devices connected with the inner ends of said wheel-spindles to skew said wheels, said devices including a worm-gearing having flexible connection with the inner ends of said wheel-spindles.

Signed by me at Tellwood, Orange Co., Florida, this 19th day of May, 1916.

FREDERIC E. BAGER.

Witnesses:
C. H. JONES,
A. B. CURTIS.

Copies of this patent may be obtained for five cents each, by addressing the "Commissioner of Patents, Washington, D. C."